(12) United States Patent
Silvanto et al.

(10) Patent No.: US 9,886,090 B2
(45) Date of Patent: Feb. 6, 2018

(54) HAPTIC NOTIFICATIONS UTILIZING HAPTIC INPUT DEVICES

(71) Applicant: Apple Inc., Cupertino, CA (US)

(72) Inventors: Mikael M. Silvanto, Cupertino, CA (US); Christiaan A. Ligtenberg, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/325,410

(22) Filed: Jul. 8, 2014

(65) Prior Publication Data

US 2016/0011664 A1    Jan. 14, 2016

(51) Int. Cl.
*G06F 3/01*    (2006.01)
*G06F 3/0354*    (2013.01)

(52) U.S. Cl.
CPC .......... *G06F 3/016* (2013.01); *G06F 3/03547* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 5,196,745 A | 3/1993 | Trumper et al. | |
| 5,293,161 A | 3/1994 | MacDonald et al. | |
| 5,424,756 A * | 6/1995 | Ho | G06F 1/1616 345/158 |
| 5,434,549 A | 7/1995 | Hirabayashi et al. | |
| 5,436,622 A | 7/1995 | Gutman et al. | |
| 5,668,423 A | 9/1997 | You et al. | |
| 5,739,759 A | 4/1998 | Nakazawa et al. | |
| 6,084,319 A | 7/2000 | Kamata et al. | |
| 6,342,880 B2 | 1/2002 | Rosenberg et al. | |
| 6,373,465 B2 | 4/2002 | Jolly et al. | |
| 6,388,789 B1 | 5/2002 | Bernstein | |
| 6,438,393 B1 | 8/2002 | Suuronen | |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Patrick F Marinelli
(74) *Attorney, Agent, or Firm* — Brownstein Hyatt Farber Schreck, LLP

(57) ABSTRACT

An electronic device may include a haptic input device, such as a haptic trackpad, that provides tactile feedback when receiving input. The electronic device may determine that one or more system level events occurs and utilize the haptic input device to provide one or more haptic notifications via one or more surfaces other than the haptic input device, such as a portion of a housing of the electronic device. In some cases, the electronic device may be configurable between a first position where the haptic input device is exposed and a second configuration where the haptic input device is covered but the surface via which the haptic notification may be provided is still exposed.

24 Claims, 5 Drawing Sheets

(56) References Cited

U.S. PATENT DOCUMENTS

| | | | |
|---|---|---|---|
| 6,445,093 B1 | 9/2002 | Binnard | |
| 6,493,612 B1 | 12/2002 | Bisset et al. | |
| 6,693,622 B1 | 2/2004 | Shahoian et al. | |
| 6,777,895 B2 | 8/2004 | Shimoda et al. | |
| 6,822,635 B2 | 11/2004 | Shahoian | |
| 6,864,877 B2 | 3/2005 | Braun et al. | |
| 6,952,203 B2 | 10/2005 | Banerjee et al. | |
| 6,988,414 B2 | 1/2006 | Ruhrig et al. | |
| 7,068,168 B2 | 6/2006 | Girshovich et al. | |
| 7,130,664 B1 | 10/2006 | Williams | |
| 7,234,379 B2 | 6/2007 | Claesson et al. | |
| 7,253,350 B2 | 8/2007 | Noro et al. | |
| 7,276,907 B2 | 10/2007 | Kitagawa et al. | |
| 7,323,959 B2 | 1/2008 | Naka et al. | |
| 7,339,572 B2 | 3/2008 | Schena | |
| 7,355,305 B2 | 4/2008 | Nakamura et al. | |
| 7,370,289 B1* | 5/2008 | Ebert | G06F 1/1613 715/704 |
| 7,392,066 B2 | 6/2008 | Hapamas | |
| 7,423,631 B2 | 9/2008 | Shahoian et al. | |
| 7,508,382 B2 | 3/2009 | Denoue et al. | |
| 7,570,254 B2 | 8/2009 | Suzuki et al. | |
| 7,656,388 B2 | 2/2010 | Schena et al. | |
| 7,667,371 B2 | 2/2010 | Sadler et al. | |
| 7,667,691 B2 | 2/2010 | Boss et al. | |
| 7,675,414 B2 | 3/2010 | Ray | |
| 7,710,397 B2 | 5/2010 | Krah et al. | |
| 7,710,399 B2 | 5/2010 | Bruneau et al. | |
| 7,741,938 B2 | 6/2010 | Kramlich | |
| 7,755,605 B2 | 7/2010 | Daniel et al. | |
| 7,798,982 B2 | 9/2010 | Zets et al. | |
| 7,825,903 B2 | 11/2010 | Anastas et al. | |
| 7,855,657 B2 | 12/2010 | Doemens et al. | |
| 7,890,863 B2 | 2/2011 | Grant et al. | |
| 7,893,922 B2 | 2/2011 | Klinghult et al. | |
| 7,904,210 B2 | 3/2011 | Pfau et al. | |
| 7,911,328 B2 | 3/2011 | Luden et al. | |
| 7,919,945 B2 | 4/2011 | Houston et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,976,230 B2 | 7/2011 | Ryynanen et al. | |
| 8,002,089 B2 | 8/2011 | Jasso et al. | |
| 8,040,224 B2 | 10/2011 | Hwang | |
| 8,053,688 B2 | 11/2011 | Conzola et al. | |
| 8,063,892 B2 | 11/2011 | Shahoian | |
| 8,081,156 B2 | 12/2011 | Ruettiger | |
| 8,125,453 B2 | 2/2012 | Shahoian et al. | |
| 8,154,537 B2 | 4/2012 | Olien et al. | |
| 8,169,402 B2 | 5/2012 | Shahoian et al. | |
| 8,174,495 B2 | 5/2012 | Takashima et al. | |
| 8,174,512 B2 | 5/2012 | Ramstein et al. | |
| 8,217,892 B2 | 7/2012 | Meadors | |
| 8,232,494 B2 | 7/2012 | Purcocks | |
| 8,248,386 B2 | 8/2012 | Harrison | |
| 8,253,686 B2 | 8/2012 | Kyung | |
| 8,262,480 B2 | 9/2012 | Cohen et al. | |
| 8,265,292 B2 | 9/2012 | Leichter | |
| 8,265,308 B2* | 9/2012 | Gitzinger et al. | 381/152 |
| 8,344,834 B2 | 1/2013 | Niiyama | |
| 8,351,104 B2 | 1/2013 | Zaifrani et al. | |
| 8,378,797 B2 | 2/2013 | Pance et al. | |
| 8,378,965 B2 | 2/2013 | Gregorio et al. | |
| 8,384,316 B2 | 2/2013 | Houston et al. | |
| 8,390,218 B2 | 3/2013 | Houston et al. | |
| 8,390,594 B2 | 3/2013 | Modarres et al. | |
| 8,400,027 B2 | 3/2013 | Dong et al. | |
| 8,405,618 B2 | 3/2013 | Colgate et al. | |
| 8,469,806 B2 | 6/2013 | Grant et al. | |
| 8,471,690 B2 | 6/2013 | Hennig et al. | |
| 8,493,177 B2 | 7/2013 | Flaherty et al. | |
| 8,493,189 B2 | 7/2013 | Suzuki | |
| 8,598,750 B2 | 12/2013 | Park | |
| 8,598,972 B2 | 12/2013 | Cho et al. | |
| 8,605,141 B2 | 12/2013 | Dialameh et al. | |
| 8,614,431 B2 | 12/2013 | Huppi et al. | |
| 8,619,031 B2 | 12/2013 | Hayward | |
| 8,624,448 B2 | 1/2014 | Kaiser et al. | |
| 8,633,916 B2 | 1/2014 | Bernstein et al. | |
| 8,639,485 B2 | 1/2014 | Connacher et al. | |
| 8,648,829 B2 | 2/2014 | Shahoian et al. | |
| 8,681,130 B2 | 3/2014 | Adhikari | |
| 8,717,151 B2 | 5/2014 | Forutanpour et al. | |
| 8,730,182 B2 | 5/2014 | Modarres et al. | |
| 8,749,495 B2 | 6/2014 | Grant et al. | |
| 8,754,759 B2 | 6/2014 | Fadell et al. | |
| 8,760,037 B2 | 6/2014 | Eshed et al. | |
| 8,773,247 B2 | 7/2014 | Ullrich | |
| 8,797,153 B2 | 8/2014 | Vanhelle et al. | |
| 8,803,670 B2 | 8/2014 | Steckel et al. | |
| 8,867,757 B1 | 10/2014 | Ooi | |
| 8,872,448 B2 | 10/2014 | Boldyrev et al. | |
| 8,878,401 B2 | 11/2014 | Lee | |
| 8,976,139 B2* | 3/2015 | Koga et al. | 345/173 |
| 8,981,682 B2 | 3/2015 | Delson et al. | |
| 8,987,951 B2 | 3/2015 | Park | |
| 9,054,605 B2 | 6/2015 | Jung et al. | |
| 9,058,077 B2 | 6/2015 | Lazaridis et al. | |
| 9,086,727 B2 | 7/2015 | Tidemand et al. | |
| 9,104,285 B2 | 8/2015 | Colgate et al. | |
| 9,122,330 B2 | 9/2015 | Bau et al. | |
| 9,134,796 B2 | 9/2015 | Lemmons et al. | |
| 9,286,907 B2 | 3/2016 | Yang et al. | |
| 9,304,587 B2 | 4/2016 | Wright et al. | |
| 9,396,629 B1 | 7/2016 | Weber et al. | |
| 9,436,280 B2 | 9/2016 | Tartz et al. | |
| 9,442,570 B2 | 9/2016 | Slonneger | |
| 9,448,713 B2 | 9/2016 | Cruz-Hernandez et al. | |
| 9,489,049 B2 | 11/2016 | Li | |
| 9,496,777 B2 | 11/2016 | Jung | |
| 9,501,149 B2 | 11/2016 | Burnbaum et al. | |
| 9,513,704 B2 | 12/2016 | Heubel et al. | |
| 9,539,164 B2 | 1/2017 | Sanders et al. | |
| 9,557,830 B2 | 1/2017 | Grant | |
| 9,632,583 B2 | 4/2017 | Virtanen et al. | |
| 2002/0033795 A1* | 3/2002 | Shahoian | G06F 1/1616 345/156 |
| 2003/0117132 A1 | 6/2003 | Klinghult | |
| 2004/0162922 A1* | 8/2004 | Kardach et al. | 710/15 |
| 2005/0036603 A1 | 2/2005 | Hughes | |
| 2005/0230594 A1 | 10/2005 | Sato et al. | |
| 2006/0017691 A1 | 1/2006 | Cruz-Hernandez et al. | |
| 2006/0209037 A1 | 9/2006 | Wang et al. | |
| 2006/0223547 A1 | 10/2006 | Chin et al. | |
| 2006/0252463 A1 | 11/2006 | Liao | |
| 2007/0106457 A1 | 5/2007 | Rosenberg | |
| 2007/0152974 A1 | 7/2007 | Kim et al. | |
| 2008/0062145 A1 | 3/2008 | Shahoian | |
| 2008/0084384 A1 | 4/2008 | Gregorio et al. | |
| 2008/0111791 A1 | 5/2008 | Nikittin | |
| 2008/0158149 A1 | 7/2008 | Levin | |
| 2009/0085879 A1 | 4/2009 | Dai et al. | |
| 2009/0115734 A1 | 5/2009 | Fredriksson et al. | |
| 2009/0147973 A1* | 6/2009 | Gitzinger et al. | 381/190 |
| 2009/0166098 A1 | 7/2009 | Sunder | |
| 2009/0167542 A1 | 7/2009 | Culbert et al. | |
| 2009/0167702 A1 | 7/2009 | Nurmi | |
| 2009/0167704 A1 | 7/2009 | Terlizzi et al. | |
| 2009/0174672 A1 | 7/2009 | Schmidt | |
| 2009/0207129 A1 | 8/2009 | Ullrich et al. | |
| 2009/0225046 A1 | 9/2009 | Kim et al. | |
| 2009/0243404 A1 | 10/2009 | Kim et al. | |
| 2009/0267892 A1 | 10/2009 | Faubert | |
| 2009/0267920 A1 | 10/2009 | Faubert et al. | |
| 2009/0303205 A1* | 12/2009 | Seibert et al. | 345/204 |
| 2009/0313542 A1 | 12/2009 | Cruz-Hernandez et al. | |
| 2010/0056953 A1 | 3/2010 | Couvillon | |
| 2010/0116629 A1 | 5/2010 | Borissov et al. | |
| 2010/0225600 A1 | 9/2010 | Dai et al. | |
| 2010/0267424 A1 | 10/2010 | Kim et al. | |
| 2010/0313425 A1 | 12/2010 | Hawes | |
| 2010/0328229 A1 | 12/2010 | Weber et al. | |
| 2011/0088003 A1* | 4/2011 | Swink | H04L 51/32 715/863 |

(56) References Cited

U.S. PATENT DOCUMENTS

| | | | |
|---|---|---|---|
| 2011/0115754 A1 | 5/2011 | Cruz-Hernandez | |
| 2011/0128239 A1 | 6/2011 | Polyakov et al. | |
| 2011/0132114 A1 | 6/2011 | Siotis | |
| 2011/0205038 A1 | 8/2011 | Drouin et al. | |
| 2011/0210834 A1 | 9/2011 | Pasquero et al. | |
| 2011/0210926 A1 | 9/2011 | Pasquero et al. | |
| 2012/0056825 A1 | 3/2012 | Ramsay et al. | |
| 2012/0062491 A1 | 3/2012 | Coni et al. | |
| 2012/0127071 A1 | 5/2012 | Jitkoff et al. | |
| 2012/0127088 A1 | 5/2012 | Pance et al. | |
| 2012/0223824 A1 | 9/2012 | Rothkopf | |
| 2012/0235942 A1 | 9/2012 | Shahoian | |
| 2012/0286943 A1 | 11/2012 | Rothkopf et al. | |
| 2012/0319827 A1 | 12/2012 | Pance et al. | |
| 2012/0327006 A1 | 12/2012 | Israr et al. | |
| 2013/0002341 A1 | 1/2013 | Maier et al. | |
| 2013/0016042 A1 | 1/2013 | Makinen et al. | |
| 2013/0044049 A1 | 2/2013 | Biggs et al. | |
| 2013/0127755 A1* | 5/2013 | Lynn et al. | 345/173 |
| 2013/0187879 A1* | 7/2013 | Koga et al. | 345/173 |
| 2013/0207793 A1 | 8/2013 | Weaber et al. | |
| 2013/0278401 A1 | 10/2013 | Flaherty et al. | |
| 2014/0002386 A1* | 1/2014 | Rosenberg et al. | 345/173 |
| 2014/0028573 A1 | 1/2014 | Olien et al. | |
| 2014/0125470 A1 | 5/2014 | Rosenberg | |
| 2014/0218183 A1* | 8/2014 | Van Schyndel et al. | 340/407.1 |
| 2014/0218853 A1* | 8/2014 | Pance et al. | 361/679.4 |
| 2014/0225831 A1* | 8/2014 | Shinozaki et al. | 345/157 |
| 2015/0097800 A1 | 4/2015 | Grant et al. | |
| 2015/0116205 A1* | 4/2015 | Westerman | G06F 3/016 345/156 |
| 2015/0126070 A1* | 5/2015 | Candelore | 439/628 |
| 2015/0130730 A1 | 5/2015 | Harley et al. | |
| 2015/0135121 A1* | 5/2015 | Peh | G06F 3/0488 715/773 |
| 2015/0277562 A1 | 5/2015 | Bard et al. | |
| 2015/0234493 A1* | 8/2015 | Parivar | G06F 3/04812 345/174 |
| 2015/0338919 A1 | 11/2015 | Weber et al. | |
| 2015/0349619 A1 | 12/2015 | Degner et al. | |
| 2016/0171767 A1 | 6/2016 | Anderson et al. | |
| 2016/0328930 A1 | 11/2016 | Weber et al. | |
| 2017/0003744 A1 | 1/2017 | Bard et al. | |
| 2017/0024010 A1 | 1/2017 | Weinraub | |

FOREIGN PATENT DOCUMENTS

| | | |
|---|---|---|
| CN | 101663104 | 3/2010 |
| CN | 101872257 | 10/2010 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO02/073587 | 9/2002 |
| WO | WO 2006/091494 | 8/2006 |
| WO | WO 2007/049253 | 5/2007 |
| WO | WO2007/114631 | 10/2007 |
| WO | WO2009/038862 | 3/2009 |
| WO | WO 2010/129892 | 11/2010 |
| WO | WO 2013/169303 | 11/2013 |
| WO | WO 2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

HAPTIC NOTIFICATIONS UTILIZING HAPTIC INPUT DEVICES

TECHNICAL FIELD

This disclosure relates generally to haptic notifications, and more specifically to haptic notifications that are provided by haptic input devices via a surface other than that of the haptic input device.

BACKGROUND

Many electronic devices provide one or more notifications to users. In some cases, such notifications may be feedback regarding input from a user. In other cases, such notifications may inform the user regarding various system level and/or application level events that have occurred.

Electronic devices may only include a limited number of components that can be used to provide notifications. Many electronic devices may have configurations where some of these limited numbers of components may be unavailable. For example, a laptop computer may provide graphical indicators regarding system level events on a display. However, the display may not be available when the laptop computer is closed as the display is not visible in such a configuration.

SUMMARY

The present disclosure discloses systems, apparatuses, and methods for providing haptic notifications. An electronic device may include a haptic input device, such as a haptic trackpad, that provides tactile feedback when receiving input. The electronic device may determine that one or more system level events occurs and utilize the haptic input device to provide one or more haptic notifications via one or more surfaces other than the haptic input device, such as a portion of a housing of the electronic device.

In some cases, the electronic device may be configurable between a first position where the haptic input device is exposed and a second configuration where the haptic input device is covered but the surface via which the haptic notification may be provided is still exposed. In various implementations, the electronic device may present notifications regarding system level events utilizing another component, such as via a graphical or other indicator on a display, and may utilize the haptic input device to provide the haptic notification when the other component is covered and/or otherwise unavailable.

In some implementations, the haptic notification may be one or more vibrations, forces, motions, temperatures, electrical currents, and/or other haptic outputs. In other implementations, the haptic notification may be a combination of one or more vibrations, forces, motions, temperatures, electrical currents, and/or other haptic outputs; one or more sounds and/or other audio alerts; and/or other haptic components. The haptic notification may be different from the tactile feedback normally provided by the haptic input device when receiving input. In some implementations, the haptic notification may be a haptic output that is stronger or weaker than a haptic output provided as part of the tactile feedback. The haptic notification may be unique to the particular system level event, thus uniquely identifying the system level event, and the electronic device may be capable of providing a variety of different haptic notifications for a variety of different detected system level events. In various implementations, the electronic device may provide different haptic notifications for different system level events via different surfaces that are all not the haptic input device.

In various embodiments, an electronic device operative to generate a haptic notification includes a housing; a haptic input device that provides tactile feedback when receiving input; and a processing unit. The haptic input device may provide a haptic notification via a portion of the housing other than the haptic input device when the processing unit determines a system level event occurs. The system level event may be an event that originates from an operating system, firmware, hardware component, hardware driver, or kernel of the electronic device.

In some embodiments, a system operative to generate a haptic notification includes a housing; a haptic input device that provides tactile feedback when receiving input; and a processing unit. The haptic input device may provide a haptic notification via a portion of the housing other than the haptic input device when the processing unit determines a system level event occurs. The system level event may be an event that originates from an operating system, firmware, hardware component, hardware driver, or kernel of the system.

In one or more embodiments, a method for providing haptic notifications may include: determining a system level event occurs for an electronic device that includes a haptic input device that provides tactile feedback when receiving input wherein the system level event is an event that originates from an operating system, firmware, hardware component, hardware driver, or kernel of the electronic device; and providing a haptic notification associated with the system level event using the haptic input device via a portion of a housing other than the haptic input device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
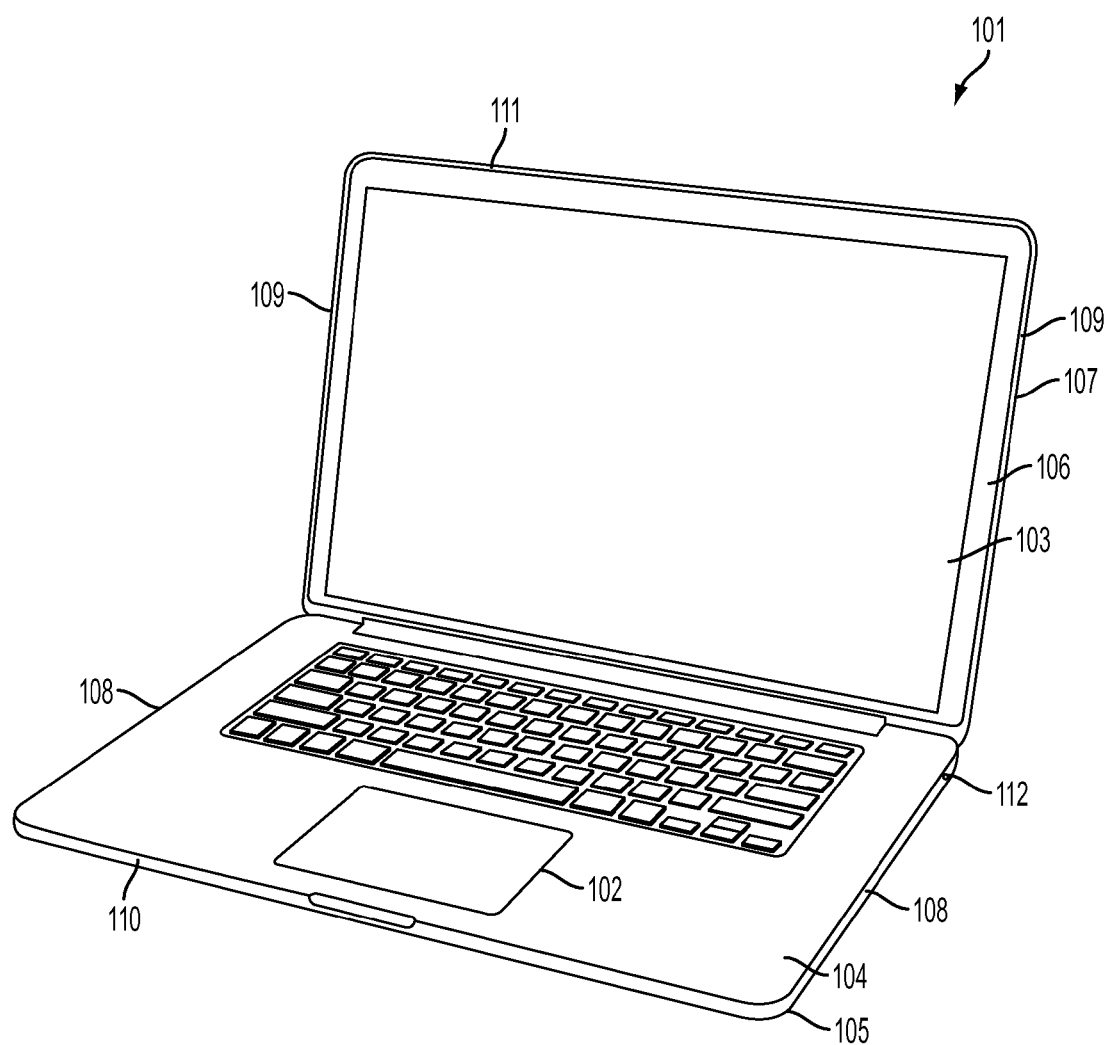
FIG. 1 is an isometric view of an example system for providing haptic notifications.

The description that follows includes sample systems, methods, and computer program products that embody various elements of the present disclosure. However, it should be understood that the described disclosure may be practiced in a variety of forms in addition to those described herein.

The present disclosure discloses systems, apparatuses, and methods for providing haptic notifications. An electronic device may include a haptic input device, such as a haptic trackpad, that provides tactile feedback when receiving input. The electronic device may determine that one or more "system level events" (i.e., events that originate from an operating system, firmware, hardware component, hardware driver, or kernel of an electronic device as opposed to events that originate from an application executing on the electronic device) occurs (such as connection/disconnection of the electronic device to a power source) and utilize the haptic input device to provide one or more haptic notifications (such as one or more vibrations, forces, motions, temperatures, electrical currents, and/or other haptic outputs) via one or more surfaces other than the haptic input device, such as a portion of a housing of the electronic device. Such a surface may be one not normally contacted by a user when providing input to the haptic input device. In this way, the haptic input device may be utilized to provide haptic notifications regarding system level events when a user is not entering input and thus may not be touching the haptic input device.

In some cases, the electronic device may be configurable between a first position where the haptic input device is exposed and a second configuration where the haptic input device is covered but the surface via which the haptic notification may be provided is still exposed. For example, a haptic trackpad may be exposed when a laptop computer is open and covered when the laptop computer is closed, but haptic notifications may be provided utilizing the haptic trackpad to produce vibrations, forces, motions, and/or other haptic outputs that can be felt on an outer surface of the laptop computer lid.

In various implementations, the electronic device may present notifications regarding system level events utilizing another component, such as via a graphical or other indicator on a display, and may utilize the haptic input device to provide the haptic notification when the other component is unavailable. For example, a laptop computer may detect a system level event for which a notification is to be provided, determine that the laptop computer is closed and thus a display is not visible because it is covered, and therefore provide a vibration, force, motion, temperature, electrical current, and/or other haptic output notification regarding the system level event utilizing the haptic input device via an outer surface of the laptop computer.

In some implementations, the haptic notification may be one or more vibrations, forces, motions, temperatures, electrical currents, and/or other haptic outputs. In other implementations, the haptic notification may be a combination of one or more vibrations, forces, motions, temperatures, electrical currents, and/or other haptic outputs; one or more sounds and/or other audio alerts; and/or other haptic components.

The haptic notification may be different from the tactile feedback normally provided by the haptic input device when receiving input. In some implementations, the haptic notification may be a haptic output that is stronger or weaker than a haptic output provided as part of the tactile feedback. The haptic notification may be unique to the particular system level event, thus uniquely identifying the system level event, and the electronic device may be capable of providing a variety of different haptic notifications for a variety of different detected system level events. In various implementations, the electronic device may provide different haptic notifications for different system level events via different surfaces that are all not the haptic input device.

Although the notifications and feedback discussed herein are described in the context of haptic output, it is understood that this is an example. In various cases, the examples and embodiments discussed herein may also provide other types of output without departing from the scope of the present disclosure. Such output may be visual output, audio output, and/or any other kind of output.

FIG. 1 is an isometric view of an example system 100 for providing haptic notifications. The system may include an electronic device 101. As illustrated, the electronic device is a laptop computer. However, it is understood that this is an example and in various implementations the electronic device may be a desktop computer, a mobile computer, a cellular telephone, a wearable device, a smart phone, a tablet computer, a digital media player, a display, a kitchen appliance, and/or any other electronic device.

The electronic device 101 may include a haptic input device 102, one or more other input/output components such as one or more displays 103, one or more power connectors 112, and/or one or more housings, housing portions, and/or other surfaces 104-111. The haptic input device may be an input device that is operable to receive input from one or more users and provide one or more tactile outputs (such as vibrations, forces, motions, temperatures, electrical currents, and/or other haptic outputs as well as other haptic components such as sound) in response to user input.

As illustrated, the haptic input device 102 may be a haptic trackpad. However, it is understood that this is an example and in various implementations the haptic input device may be a haptic touch screen, a haptic keyboard, and/or any other device that is capable of receiving input and providing tactile feedback in response to input.

The electronic device 101 may detect a system level event for which a notification is to be provided. The electronic device may drive the haptic input device 102 to provide a haptic notification (such as one or more vibrations, forces, motions, temperatures, electrical currents, and/or other haptic outputs and/or audio) via one or more surfaces (such as one or more portions of housing surfaces 104-111) other than the haptic input device.

Figure 2:
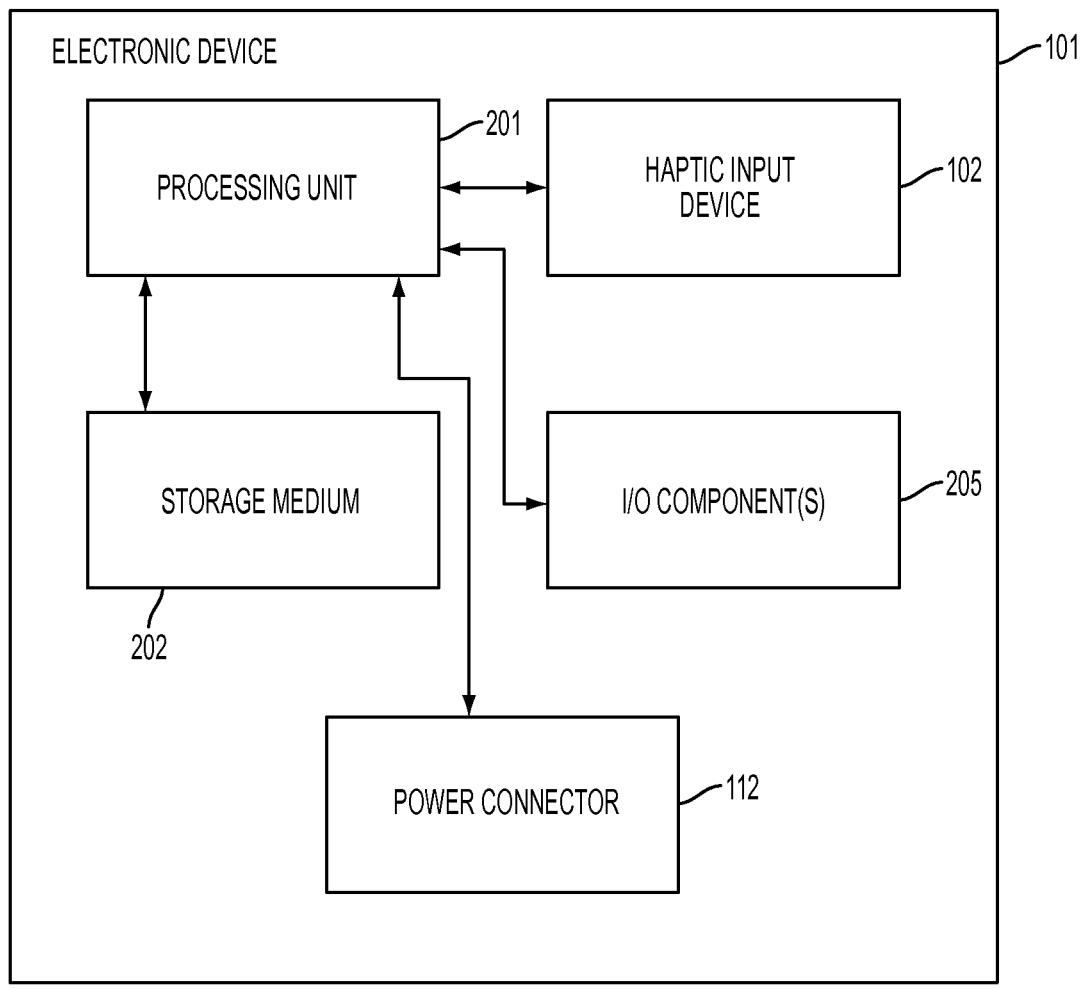
FIG. 2 is a block diagram illustrating functional relationships of example components of an electronic device that may be utilized in the system of FIG. 1.

FIG. 2 is a block diagram illustrating functional relationships of example components of an electronic device 101 that may be utilized in the system 100 of FIG. 1. As illustrated, the electronic device may include one or more processing units 201, one or more haptic input devices 102, one or more non-transitory storage media 202 (which may take the form of, but is not limited to, a magnetic storage medium; optical storage medium; magneto-optical storage medium; read only memory; random access memory; erasable programmable memory; flash memory; and so on), one or more input/output components 205 (such as the display 103 of FIG. 1), and/or one or more power connectors 112.

The processing unit 201 may execute instructions stored in the non-transitory storage medium to perform various electronic device 101 functions. For example, the processing unit may detect the occurrence of one or more system level events, determine to present one or more haptic notifications regarding such detected system level events, and drive the haptic input device 102 to provide such haptic notifications via one or more surfaces other than the haptic input device.

Returning to FIG. 1, the electronic device 101 may be configurable between a first position where the haptic input device 101 is exposed and available to receive input and a second position where the haptic input device is covered and/or otherwise unavailable to receive input. For example, as illustrated the electronic device may be a laptop computer that may be configured in at least a laptop open position where the haptic input device 102 is exposed and a laptop closed position (see FIG. 3B) where the haptic input device is covered. In some implementations, the surface through which the haptic notification is provided may be one that is not normally touched by a user when not operating the haptic input device and/or one that is exposed when the electronic device is in the second position (such as surfaces 105 and/or 107-111 in the laptop closed position shown in FIG. 3B).

In various implementations, the electronic device 101 may provide notifications regarding the detected system level event via one or more other components when such are available and may utilize the haptic input device 102 to provide the haptic notification via one or more other surfaces when the normally used component is covered and/or otherwise unavailable. In various cases, the electronic device may detect whether or not such components are available when a system level event is detected.

Figure 3A:
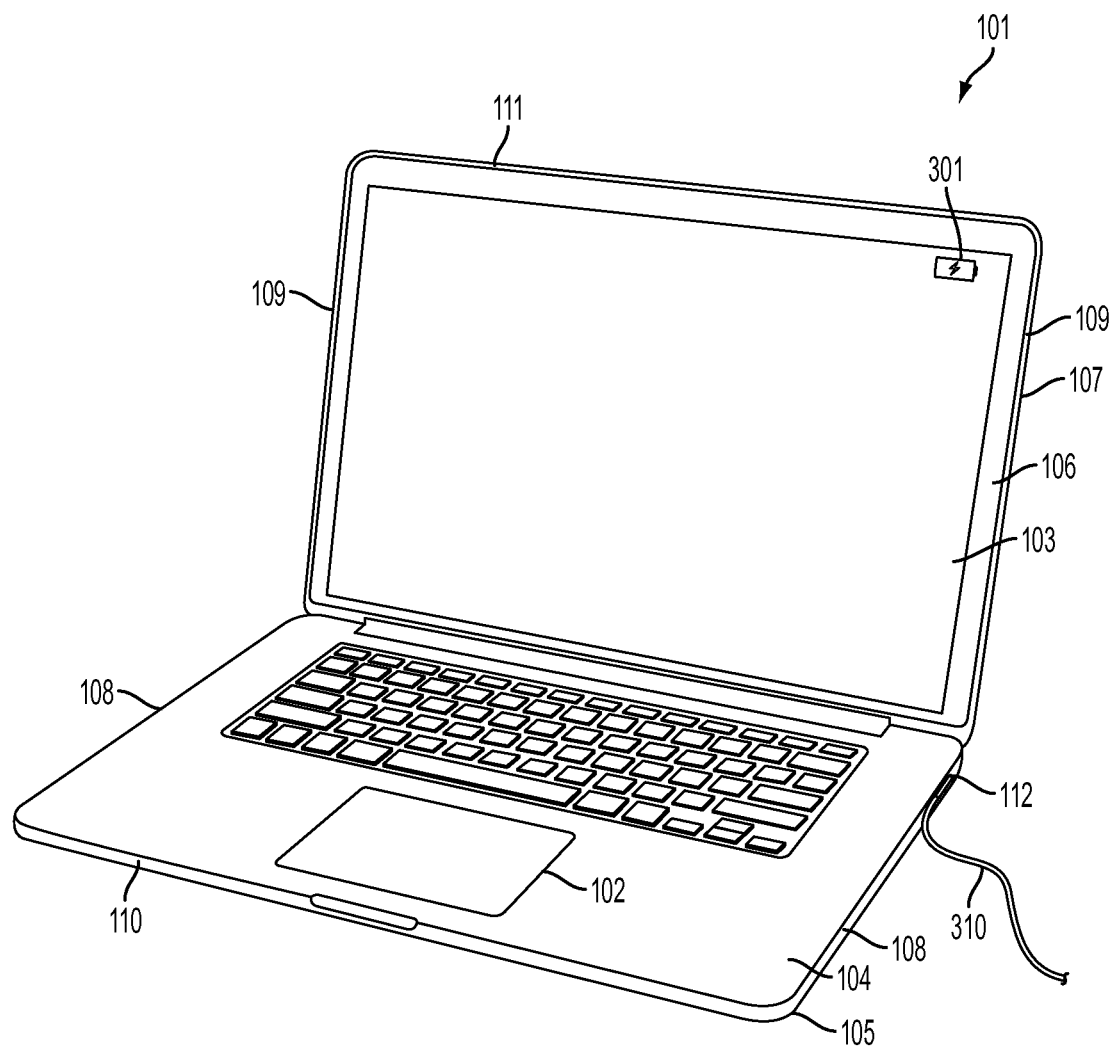
FIG. 3A illustrates the example system of FIG. 1 when a power cord is connected to the electronic device while the electronic device is in the open position.

For example, FIG. 3A illustrates the example system 100 of FIG. 1 when a power cord 310 is connected to the electronic device while the electronic device 101 is in an open position. When the electronic device detects that the power cord is connected to the power connector 112, the electronic device may determine whether or not the electronic device is in the open position. When the electronic device is determined to be in the open position, as in FIG. 3A, the electronic device may display a graphical indicator 301 that power is connected on the display 103.

Figure 3B:
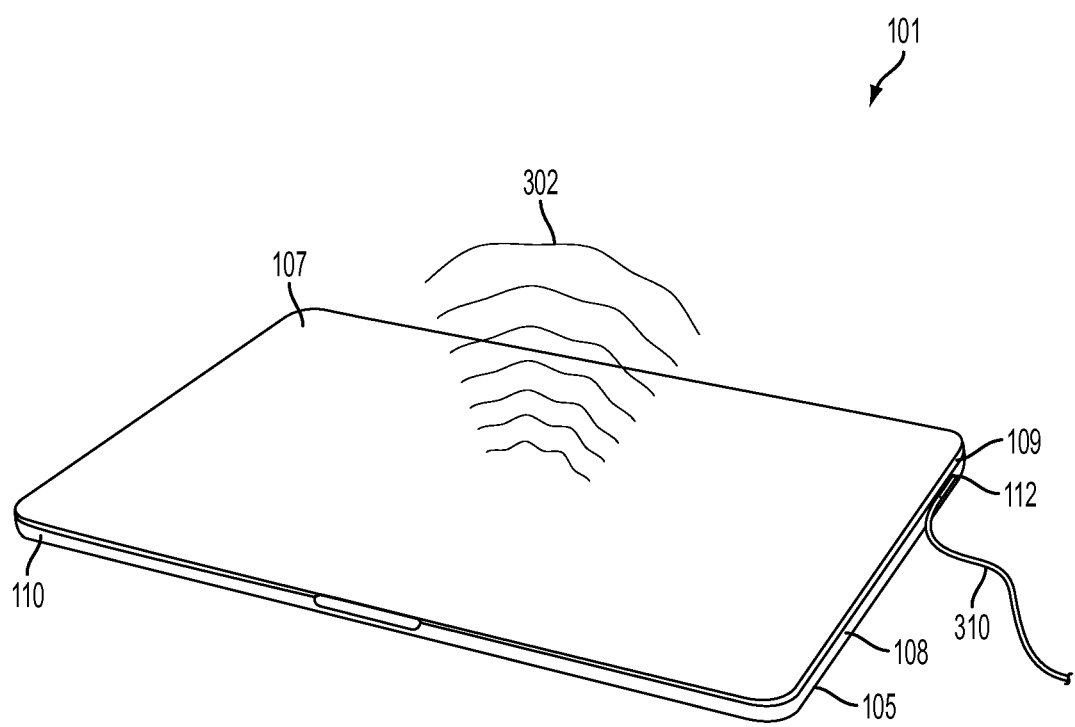
FIG. 3B illustrates the example system of FIG. 1 when a power cord is connected to the electronic device while the electronic device is in the closed position.

However, as shown in FIG. 3B, when the electronic device 101 is determined to be in the open position and connection of the power cord 310 to the power connector 112 is detected, the electronic device may determine that the display 103 is unavailable because it is covered and instead utilize the haptic input device 102 to provide a haptic notification 302 via the surface 107. Such a haptic notification may be one or more vibrations, forces, motions, temperatures, electrical currents, and/or other haptic outputs. In some cases, such a haptic notification may be one or more vibrations, forces, motions, temperatures, electrical currents, and/or other haptic outputs and/or one or more sounds.

However, it is understood that this is an example. In some cases, a laptop computer trackpad may be capable of providing a haptic output that is strong enough to move the cover and/or other outer housing of the laptop computer when the laptop is closed. When the laptop computer detects that a power input is attached to the laptop computer while the laptop computer is closed, the trackpad may provide the haptic output which may be felt by a user through the cover and/or other outer housing despite the trackpad surface being completely concealed by the closed configuration of the laptop computer.

Returning to FIG. 1, the haptic notification provided utilizing the haptic input device 102 may be different from the tactile feedback normally provided by the haptic input device when receiving input. In some implementations, the haptic notification may be a haptic output that is stronger than a vibration provided as part of the tactile feedback. In other implementations, the haptic notification may be a haptic output that is weaker than a haptic output provided as part of the tactile feedback.

In some implementations, the haptic notification may be unique to the particular system level event, thus uniquely identifying the system level event. The electronic device 101 may be capable of providing a variety of different haptic notifications for a variety of different detected system level events.

In some cases, the electronic device 101 may provide different haptic notifications for different system level events via different surfaces that are all not the haptic input device 102. For example, the electronic device may provide a first level of vibration, force, motion, temperature, electrical current, and/or other haptic output via the surface 107 when power is connected to the power connector 112 and a second level of vibration, force, motion, temperature, electrical current, and/or other haptic output via the surface 105 when power is disconnected from the power connector.

The electronic device 101 may provide haptic notifications for a variety of different system level events. Such system level events may be any kind of system level event such as connection/disconnection of power, connection/disconnection of one or more communication media, battery power state and/or reaching of thresholds related to battery power state, system resource levels and/or reaching of thresholds related to system resource levels, electronic device temperature, system state changes, available updates, emergency conditions, hardware and/or software failures, and/or any other event that occurs at the system level of the electronic device.

In some implementations, the electronic device 101 may also provide haptic notifications for a variety of different other events such as events occurring within one or more applications executing on the electronic device. Such application level events may include, but are not limited to, received messages, task completions (such as completed downloads or installations), switching between communication modes of one or more communication media (such as between roaming and non-roaming communication modes), application state changes, input needed, security alerts, and/or any other event that occurs at the application level of the electronic device.

Figure 4:
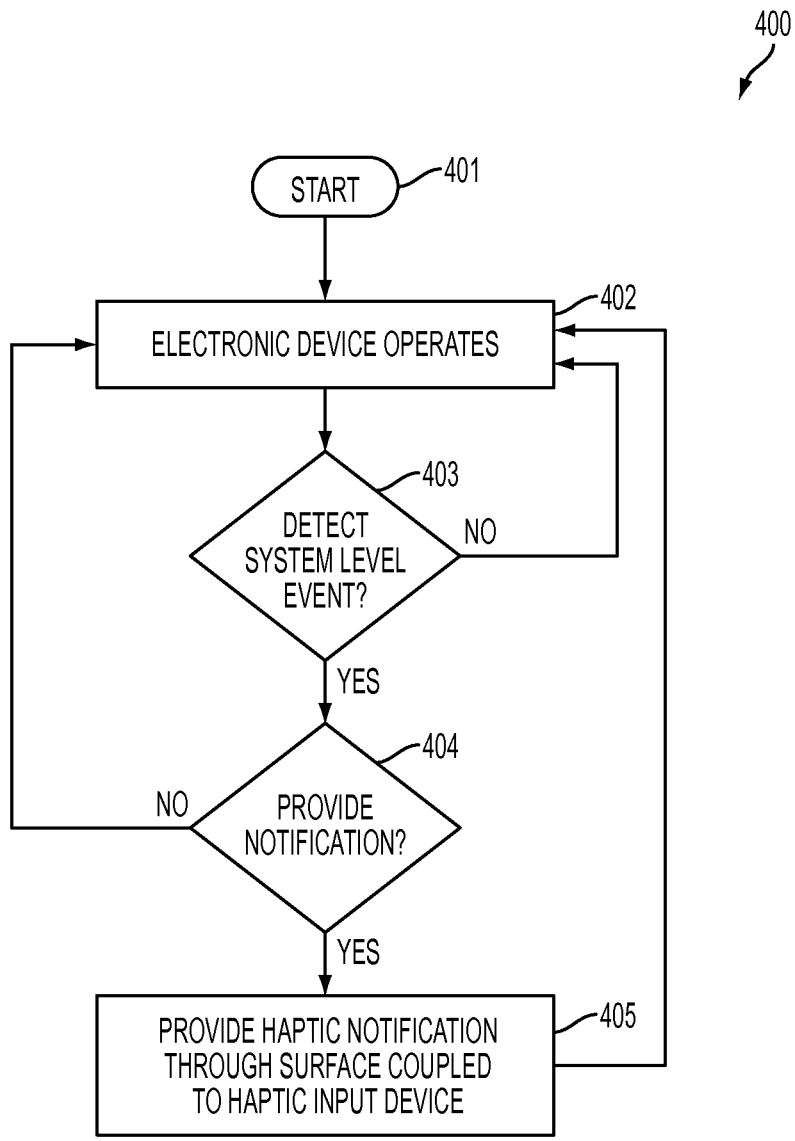
FIG. 4 is a flow chart illustrating an example method for providing haptic notifications. This method may be performed by the example system of FIG. 1.

FIG. 4 is a flow chart illustrating an example method 400 for providing haptic notifications. This method may be performed by the example system 100 of FIG. 1.

The flow may begin at block 401 and proceed to block 402 where an electronic device operates. The flow then proceeds to block 403 where the electronic device may determine whether or not the occurrence of a system level event is detected. If so, the flow may proceed to block 404. Otherwise, the flow may return to block 402 where the electronic device continues to operate.

At block 404, after the electronic device detects that a system level event has occurred, the electronic device may determine whether or not to provide a haptic notification for the detected occurrence. If so, the flow may proceed to block 405. Otherwise, the flow may return to block 402 where the electronic device continues to operate.

In some cases, the electronic device may maintain a lookup table or other data structure specifying which system level events for which to provide haptic notifications and which system level events for which to not provide haptic notifications. In other cases, the electronic device may determine to provide a haptic notification for a detected system level event occurrence when an output component normally used to provide notifications for the system level event is unavailable and to not provide such a haptic notification when the output component is available.

At block 405, after the electronic device determines to provide a haptic notification for the detected occurrence, the electronic device may provide the haptic notification through a surface (such as one or more housing portions of the electronic device) coupled to a haptic input device. The flow may then return to block 402 where the electronic device continues to operate.

Although the example method 400 is illustrated and described as including particular operations performed in a particular order, it is understood that this is an example. In various implementations, various orders of the same, similar, and/or different operations may be performed without departing from the scope of the present disclosure.

For example, the example method 400 is illustrated and described as determining whether or not to provide a haptic notification for the detected occurrence of a system level event at block 404. However, in various implementations the electronic device may not perform such a determination and may instead provide a haptic notification for every detected occurrence of a system level event. In some cases of such implementations, the electronic device may only monitor for the occurrence of system level events for which haptic notifications are to be provided.

By way of another example, the example method 400 illustrates the electronic device providing the haptic notification utilizing the haptic input device via a surface other than the haptic input device at block 405. However, in some implementations the electronic device may first determine the haptic notification that corresponds to the system level event for which an occurrence has been detected and then provide that determined haptic notification.

By way of still another example, prior to providing the haptic notification, the electronic device may first determine a surface other than the haptic input device that a user is currently touching when the occurrence of a system level event is detected. Such detection may be accomplished utilizing one or more sensors such as a proximity sensor. The electronic device may then drive the haptic input device to provide the haptic notification via the surface other than the haptic input device that the electronic device has determined the user is currently touching. In this way, the electronic device may better ensure that the haptic notification will be perceived by the user and not muffled or otherwise lost.

As described above and illustrated in the accompanying figures, the present disclosure discloses systems, apparatuses, and methods for providing haptic notifications. An electronic device may include a haptic input device, such as a haptic trackpad, that provides tactile feedback when receiving input. The electronic device may determine that one or more system level events occurs (such as connection/disconnection of the electronic device to a power source) and utilize the haptic input device to provide one or more haptic notifications (such as one or more vibrations, forces, motions, temperatures, electrical currents, and/or other haptic outputs) via one or more surfaces other than the haptic input device, such as a portion of a housing of the electronic device. Such a surface may be one not normally contacted by a user when providing input to the haptic input device. In this way, the haptic input device may be utilized to provide haptic notifications regarding system level events when a user is not entering input and thus may not be touching the haptic input device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A laptop computer operative to generate a haptic notification, comprising:
   a first housing;
   a second housing coupled to the first housing;
   a display coupled to the second housing;
   a haptic trackpad, coupled to the first housing, that provides tactile feedback when receiving input and is operable to move a cursor on the display; and
   a processing unit; wherein:
   the haptic trackpad provides a haptic notification by providing a vibration via a portion of the second housing when the processing unit determines a system level event occurs and the haptic trackpad is unavailable;
   the haptic trackpad does not provide the haptic notification when the haptic trackpad is available; and
   the system level event is an event that originates from an operating system, firmware, hardware component, hardware driver, or kernel of the electronic device.

2. The laptop computer of claim 1, wherein the laptop computer is configurable between:
   a first position where the haptic trackpad is exposed; and
   a second position where the haptic trackpad is covered.

3. The laptop computer of claim 2, wherein:
   the first position comprises a laptop open position;
   the second position comprises a laptop closed position; and
   the system level event comprises connection of the laptop computer to a power input.

4. The laptop computer of claim 2, wherein the portion of the second housing is exposed in the closed position.

5. The laptop computer of claim 3, wherein the system level event comprises disconnecting a power connector from the power input.

6. The laptop computer of claim 1, wherein the haptic notification includes a combination of a vibration and another haptic output.

7. The laptop computer of claim 1, wherein the haptic notification includes a combination of a vibration and a sound.

8. The laptop computer of claim 1, wherein the system level event comprises connection of the laptop computer to a power connector.

9. The laptop computer of claim 1, wherein the portion of the second housing is not contacted by a user when providing input to the haptic trackpad.

10. The laptop computer of claim 1, wherein the haptic notification includes a haptic output that is at least one of stronger than a haptic output provided as part of the tactile feedback or weaker than the haptic output provided as part of the tactile feedback.

11. A laptop computer operative to generate a haptic notification, comprising:
a housing;
a haptic trackpad that provides tactile when receiving input; and
a processing unit; wherein:
the haptic trackpad provides a haptic notification via a portion of the housing other than the haptic trackpad when the processing unit determines that the laptop computer is connected to a power connector and the haptic trackpad is unavailable; and
the haptic trackpad does not provide the haptic notification when the haptic trackpad is available.

12. The laptop computer of claim 11, wherein the haptic trackpad surface is unavailable for providing output when the laptop computer is closed.

13. The laptop computer of claim 11, wherein the tactile feedback is different than the haptic notification.

14. The laptop computer of claim 12, wherein the haptic trackpad surface is unavailable when the laptop computer is closed because the haptic trackpad surface is covered.

15. The laptop computer of claim 14, wherein the haptic trackpad surface is covered by the housing.

16. A laptop computer operative to generate a haptic notification, comprising:
a first housing;
a second housing coupled to the first housing;
a haptic trackpad coupled to the second housing that provides tactile feedback via a haptic trackpad surface when receiving input; and
a processing unit; wherein:
the haptic trackpad provides a haptic notification via a portion of the first housing when the processing unit determines a system level event occurs and the haptic trackpad is unavailable;
the haptic trackpad does not provide the haptic notification when the haptic trackpad is available; and
the system level event comprises the laptop computer electrically connecting to a power connector.

17. The laptop computer of claim 16, wherein:
the haptic trackpad provides a first haptic notification when the processing unit determines a first system level event occurs and the haptic trackpad is unavailable; and
the haptic trackpad provides a second haptic notification that when the processing unit determines a second system level event occurs, the second haptic notification having a different haptic characteristics than the first haptic notification.

18. The laptop computer of claim 17, wherein:
the first haptic notification is a first vibration; and
the second haptic notification is a second vibration different from the first vibration.

19. The laptop computer of claim 17, wherein:
the haptic trackpad provides the first haptic notification via a first portion of the first housing;
the second haptic notification via a second portion of the first housing; and
the second portion is different from the first portion.

20. The laptop computer of claim 16, wherein the haptic trackpad provides an additional haptic notification when the processing unit determines an application level event occurs.

21. A laptop computer operative to generate a haptic notification, comprising:
a laptop housing;
a display coupled to the laptop housing;
a haptic trackpad having an input surface, coupled to the laptop housing, that is configured to provide tactile feedback when receiving input and is operable to move a cursor on the display; and
a processing unit; wherein:
in response to a system level event, the haptic trackpad is configured to provide a haptic notification when the haptic trackpad is unavailable by transmitting a vibration via an external portion of the laptop housing while the laptop housing is closed, covering the haptic trackpad; and
the haptic trackpad does not provide the haptic notification when the haptic trackpad is available.

22. The laptop computer of claim 21, wherein the tactile feedback is a different kind of haptic output than the haptic notification.

23. The laptop computer of claim 21, wherein the system level event comprises the laptop computer electrically connecting to a dedicated power connector.

24. The laptop computer of claim 21, wherein the haptic trackpad is uncovered when the laptop housing is opened.

* * * * *